Sept. 24, 1963   G. HOHWART ETAL   3,104,886
CHUCK
Filed July 20, 1962   2 Sheets-Sheet 2

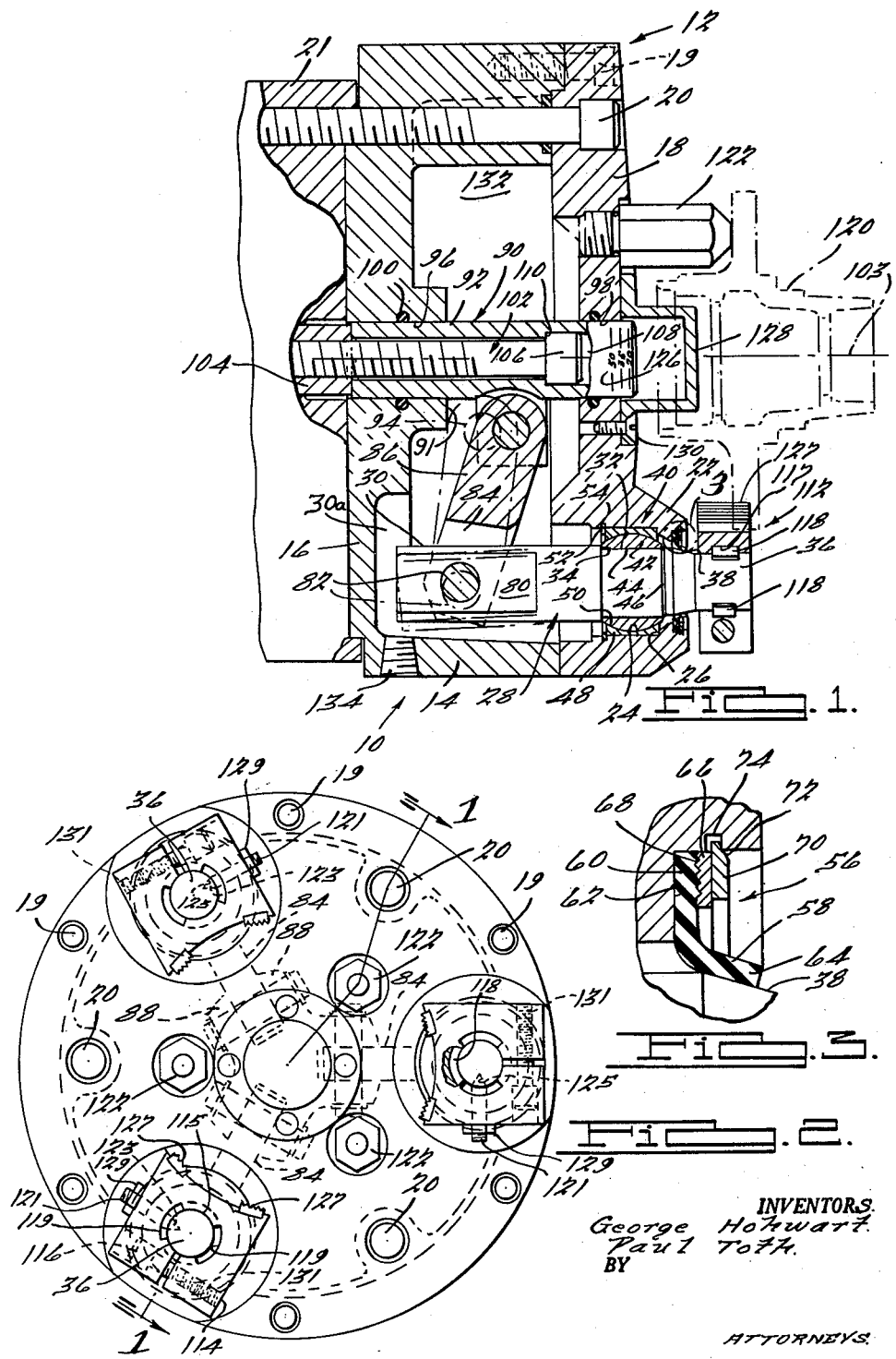

INVENTORS.
George Hohwart
Paul Toth
BY
Harness, Dickey & Pierce
ATTORNEYS.

United States Patent Office 3,104,886
Patented Sept. 24, 1963

3,104,886
CHUCK
George Hohwart, Farmington, and Paul Toth, Allen Park, Mich., assignors to N. A. Woodworth Company, Ferndale, Mich., a corporation of Michigan
Filed July 20, 1962, Ser. No. 211,179
7 Claims. (Cl. 279—106)

This invention relates generally to chucks and more particularly to an improved power chuck having novel workpiece engaging jaws mounted on rocker arms.

This is a continuation-in-part of our copending application Serial No. 33,542 filed June 2, 1960.

Conventional power chucks now in use have jaws which slide in exposed ways and are subject to the disadvantage that dirt, coolant, chips and the like enter the ways and bind the jaws causing a substantial loss of power and resulting in rapid wear of the moving parts. It is not uncommon to experience as much as a fifty percent loss in power in twenty-four hours due to loss of lubricant in the exposed joints and the physical presence of grit particles between the jaws and the ways. These conditions of course require frequent removal of the chuck for cleaning and repair and consequential loss of production time for the machine involved. Another disadvantage of these conventional chucks is an inherent tendency to move the workpiece away from the end stops as a result of play or looseness of the jaws in the ways. Such movement may be slight but it is significant because it affects the accuracy of the work performed in the chuck as well as the torque transmitted to the workpiece.

An important object of this invention therefore is to provide an improved power chuck in which (1) the workpiece engaging jaws are mounted on rocker arms that are pivoted on lubricated ball joints, (2) the actuating mechanism for moving the rocker arms is completely enclosed and lubricated, (3) the jaws are moved in a path which includes a component in the direction of the end stops for positively moving the workpiece against the end stops which thus function to impart additional driving force to the workpiece, and (4) a lever mechanism which provides for an efficient transfer of power to the jaws to effect clamping of the workpiece against the end stops and a constant efficiency in performance for the chuck as a whole.

Another object of this invention is to provide a chuck of the above mentioned character in which the jaws are uniquely connected to the rocker arms so as to be readily removable while at the same time assuring adequate strength to resist the terrific stresses developed at these connections in use.

Still another object of the invention is to provide a chuck of the above mentioned character in which the jaws are adjustable to assure a properly close fit with the rocker arms.

Yet another object of the invention is to provide an essentially close fit between the jaws and the rocker arms which minimizes play or looseness of the jaws and at the same time permits the jaws to turn or rock slightly so as to adapt to or accommodate roughness or irregularities in the surface of the work such as occur in the case of casings, for example.

A further object of the invention is to provide means for regulating or controlling the amount of float in the jaws so that the latter are always facing properly to engage the work and at the same time are free to move sufficiently to accommodate variations occurring in any given run of workpieces.

Further objects, features and advantages of this invention will become apparent from a consideration of the following description, the appended claims and the accompanying drawing in which:

FIGURE 1 is a longitudinal sectional view taken on the line 1—1 in FIG. 2 of a chuck embodying this invention;

FIG. 2 is a front elevational view of the chuck shown in FIG. 1;

FIG. 3 is an enlarged detail view of the portion of the chuck shown in FIG. 1 enclosed within the circle "3";

FIG. 6 is a longitudinal sectional view through the jaw shown in FIG. 5 with the rock shaft and adjusting screw omitted.

Figure 4:
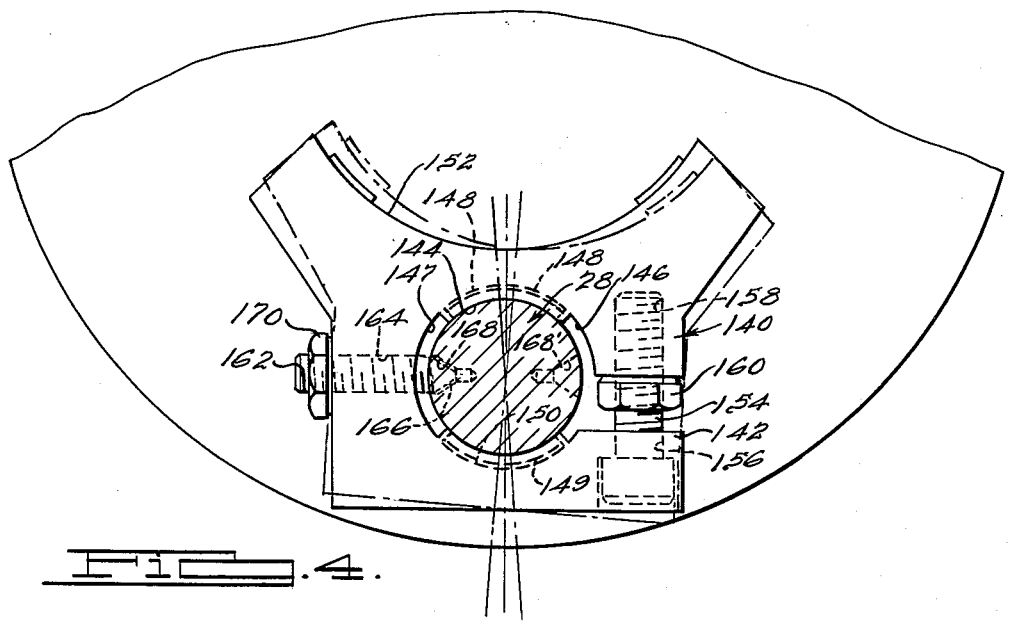
FIG. 4 is an enlarged fragmentary front elevational view showing a modified and preferred form of jaw construction and illustrating the manner in which the jaw is mounted on the rocker arm.

As perhaps best shown in FIG. 1, the chuck of this invention, indicated generally at 10, includes a housing 12 which consists of a hollow body 14 closed at its rear side by a wall 16 and provided at its front side with a removable cover plate 18 which is secured to the body 14 by a plurality of bolts 19. Bolts 20 are utilized for mounting the chuck 10 on a machine having a spindle 21. The cover plate 18 is formed with a plurality of bosses 22 each of which has a through opening 24 provided with an internal shoulder 26. It is to be understood that while three openings 24 are shown in the illustrated form of the chuck 10, more or less openings 24 may be provided if desired. An elongated rocker arm 28, which may be either straight or have angularly related portions, extends through each of the openings 24. The rocker arm 28 here shown has a cylindrical inner end portion 30 disposed within the housing 12, an intermediate reduced portion 32 separated from the portion 30 by a radial shoulder 34, a further reduced outer end portion 36 disposed outside the housing 12 and a tapered connecting portion 38 between the portions 32 and 36.

A swivel mounting in the form of a ball and socket joint 40 is provided for each arm 28, and as shown in the drawing, each joint is mounted in one of the openings 24 and on the intermediate rocker arm portion 32 for pivotally supporting arm 28 on the cover plate 18. More specifically, the joint 40 consists of a spherical ball member 42 having an axial bore 44 which receives and snugly fits the intermediate rocker arm portion 32, and the member 42 butts at one end against the shoulder 34. If desired, however, the ball member 42 may be formed as an integral part of the rocker arm 28. A snap ring 46 on the rocker arm 28 ahead of the member 42 holds the latter against the shoulder 34. The ball member 42 is rockably mounted in the spherical opening 50 of a supporting ring 48 which fits snugly in the opening 24 and is held against the shoulder 26 by a snap ring 52 in the slot 54.

A seal assembly 56 (FIG. 3) surrounds each rocker arm 28 at the outer side of the opening 24 to seal the joint 40 against entry of dirt, chips, and other foreign matter which might wear the joint 40. As shown, the seal assembly 56 consists of a resilient annular sealing member 58 of rubber or the like having its outer edge portion 60 positioned against a shoulder 62 surrounding the opening 24 at the outer end thereof. The inner edge portion 64 of the sealing member 58 is smaller in diameter than the adjacent arm portion 38 so that the inherent resiliency of the sealing member maintains it in sealing engagement with the rocker arm. A clamp ring 66 has teeth or serrations 68 on one face thereof which engage the outer edge portion 60 of the sealing member 58 so as to clamp the member 58 between the shoulder 62 and the ring 66. A snap ring 70 in the groove 74 at the outer side of the ring 66 has an inclined outer edge surface 72 which wedges against one edge of a groove 74 to urge the ring 70 against the clamping ring 66 and the latter into tight engagement with the sealing member 58. This holds the sealing member 58 in a position in which it will be in sealing engagement with the rocker arm portion 38 at all points around the periphery thereof during pivoting or rocking of the rocker arm 28.

The inner end portion 30 of each rocker arm 28 is provided on opposite sides thereof with flats 80, only one of which is shown, and a pivot pin 82 extending from the portions 80 connects the arm to a toggle lever 86. Behind the toggle 86, the arm 28 extends into a radial way 30a which confines movement of the arms to a direction radially of the housing 12 and limits lateral movement thereof. The bifurcated end portion 84 of the toggle lever 86 straddles the flats 80. The opposite end of the toggle lever 86 is connected by a pivot 94 to lugs 88 on the elongated tubular hub 92 of a reciprocable spider 90 disposed centrally of the housing 12.

The hub 92 of the spider 90 is slidably mounted in axially aligned openings 96 and 98 in the housing wall 16 and the cover plate 18 and seals 100 of the O-ring type are mounted in the openings 96 and 98 so that they engage the hub 92 to prevent loss of lubricant from the housing 12. A drawbar 104, which is a part of the machine on which the chuck 10 is mounted, butts the left end, as viewed in FIG. 1, of the hub 92 and is secured to the hub 92 by a bolt 102 which extends axially through the hub 92. The bolt 102 has an enlarged head 106 which is positioned within a countersink 108 in the outer end of the hub 92 so that it engages a shoulder 110 formed at the inner end of the countersink 108. The drawbar 104 is connected to any suitable power means (not shown) on the machine which is operable to apply a pulling force of the necessary magnitude to the drawbar 104 and to return the drawbar 104 in the opposite direction.

In the use of the chuck 10, jaws 112 of a desired size and shape are mounted on the outer ends 36 of the rocker arms 28, the size of the jaws 112 being used depending on the size of the workpiece to be gripped in the chuck 10. Each jaw 112 includes a body 114 provided with a longitudinal bore 115 in which an annular peripheral inner groove 117 is formed intermediate the ends of the body 114. The outer end portion 36 of each rocker arm 28 is formed with a pair of diametrically opposite peripheral keys or lugs 118 of a size to pass longitudinally through a pair of opposed longitudinal or axial ways 119 formed in the bore 115 during sliding movement of the body 114 onto the rocker arm portion 36. The body 114 is then rotated to position the keys 118 in the annular groove 117 between the ways 119. A set screw 121 having a conical tip 123 extends through the body 114 so that the tip 123 projects into a conical cavity 125 in the rocker arm 28. The amount of floating movement of the body 114 relative to the rocker arm 28 so that the jaw will adapt itself to the surface of the workpiece as it grips the workpiece is determined by adjusting set screw 121. A lock nut 129 holds the set screw 121 in an adjusted position. A clamp screw 116 is tightened to hold the body 114 on the rocker arm 28 so as to prevent tipping movement of the body 114 about an axis extending transversely of the arm 28. The screw 116 for each body 114 can be adjusted to either hold the body 114 in a fixed position on its arm 28 or to permit some rotation of the body 114 on the arm within limits determined by the position of the set screw 121. A set screw 131 is provided for each screw 116 to hold it in an adjusted position.

Serrated jaw elements 127 are mounted on the radially inner side of the body 114 for engagement with the workpiece, which is indicated in broken lines at 120 in FIG. 1. As there shown, the elements 127 are sufficiently wide such that only a portion of each element 127 grips the workpiece 120. When these portions of the elements 127 become worn the body 114 can readily be removed from the arm 28, by loosening the bolt 116 and backing off the set screw 121, and turned around and re-mounted on the arm 28 so that the unworn portions of the elements 127 are engageable with the workpiece. The mounting of each jaw 112 permits easy removal and re-mounting. If desired, each body 114 may be provided with two sets of longitudinally spaced jaw elements for engagement with rough and finished parts of a workpiece when the workpiece is reversed on the chuck 10 following reversal of each jaw 112. End stops 122, illustrated as being three in number, are mounted on the cover plate 18 for engagement with the workpiece 120 to stabilize the workpiece in its gripped position on the cover plate 18.

In the initial setup of the chuck 10 for a particular workpiece 120, the stroke of the power means (not shown) for operating the draw bar 104 is initially adjusted to give the desired amount of jaw movement on the diameter of the workpiece and to adjust the power ratio of the chuck, namely, the ratio of the force applied to the toggle levers to the force applied by the jaws 112 to the workpiece 120. In other words, the farther forward (toward the right in FIG. 1) the spider 90 is moved, prior to application of the pulling force thereto, the wider the opening encompassed by the jaws 112 and the smaller the angle of the toggle levers 86 relative to the rocker arms 28. Consequently, when the spider 90 is moved rearwardly by the application of draw bar pull thereto, the lower the power ratio. The extent of jaw opening and the power ratio is readily checked by referring to a scale 126 on the outer end of the spider hub 92. This scale can be compared to a chart (not shown) which for any scale reading will indicate the power ratio and the amount of jaw movement on the diameter. A guard member 128, of cap-shape, is removably secured by screws 130 to the cover plate 18 so as to enclose the outer end of the hub 92 and protect it against accidental damage and encumbrance with foreign particles. While adjustment of the drawbar stroke is possible as indicated above, it is seldom adjusted as a practical matter. Usually, the jaws 112 are bored to adapt them to a particular workpiece and so that approximately one-half the illustrated toggle lever movement is effective to move the jaws to a work clamping position.

With the chuck 10 in the position shown by solid lines in FIG. 1, assume that the jaw elements 127 are slightly spaced from the workpiece 120 when it is held in a centered position in the chuck. When a pulling force is applied to the drawbar 104, the spider hub 92 is moved toward the left as viewed in FIG. 1 so as to move the pin 94 to the broken line position and thereby move the pin 82 radially outwardly relative to the chuck axis 103 to the broken line position shown therein to rock each rocker arm 28 about the ball and socket joint 40 therefor so as to move the jaw 112 into tight engagement with the workpiece 120. In the fully retracted position of the drawbar 104, the toggle levers 86 seat on a central hub portion of the housing back wall 16 to prevent excess straightening of the levers and consequential destructive build-up of the forces applied to the rocker arms 28 and thence to the work through the jaws 112.

Each rocker arm 28, during its movement, passes through a position in which the outer terminal portion 36 thereof is parallel to the chuck axis 103. Consequently, during the final portion of the rocking movement of each rocker arm 28, the jaw 112 thereon follows a curved path which has a component in a direction toward the cover plate 18 and parallel to the axis 103. As a result, the workpiece 120 is gripped by the jaws 112 and moved rearwardly toward the cover plate 18 into tight engagement with the end stops 122 to thereby stabilize the support of the workpiece 120 on the chuck 10. The engagement of the end stops 122 with the workpiece 120 has the additional advantage that the end stops 122 can also impart rotational forces from the chuck to the workpiece.

The workpiece 120 is readily released by moving the hub 92 in a reverse direction toward the workpiece to in turn move the toggle levers in directions to actuate the rocker arms 28 so that they are swung in a direction to move the jaws 112 away from the workpiece. Each jaw 112 is shown mounted on a single rocker arm 28 but it is to be understood that a pair of rocker arms 28 may be utilized when necessary for structural purposes.

The chamber 132 formed in the body 14 and closed by the cover plate 18 is partially filled with a lubricant such as oil and a drain plug 134 is provided in one side of the body 14 for removing and replacing lubricant. During operation of the chuck 10, when it is rotated or turned quickly, this lubricant is moved by centrifugal forces into engagement with the ball joints 40 so as to maintain them in a lubricated condition, and the seals 58 prevent leakage of fluid.

FIGURE 4 shows a preferred form of jaw designated generally by the numeral 140 which is similar to the jaw 112 first described but of a modified construction having greater strength. In this connection, it will be readily apparent that large stresses are developed in the jaws in use and particularly at the connection between the jaws and the rocker arms 28 due to the manner in which the jaws extend radially inwardly from the rocker arms and the pullback action inherent in the operation of the chuck. These forces are developed in the jaws and concentrated at the connections particularly in radial directions. To assure maximum strength, the jaw 140 has a through slot 142 located at the side of the jaw rather than at the back as in the first form of the invention. Otherwise, the jaw 140 is similar in all essential respects to the jaw 112.

Each of the jaws 140 has a central opening 144 which receives the terminal end of the rocker arm 28, and the opening 144 is formed with opposed ways 146 and 147 which accommodate radially projecting diametrically opposed keys or lugs 148 and 149 formed on and integral with the rocker arm. An annular groove 150 provided in the opening 144 at substantially the middle of the jaw 140 extends through the ways 146 and 147. As shown in the drawing, the keys 148 and 149 are disposed at the inner and outer sides of the rocker arm 28 and on a radius of the chuck, and the ways 146 and 147 are disposed at the sides of the jaw 140.

As a result of the above construction and correlation of parts, the jaw 140 is applied to the rocker arm 28 with the work engaging face 152 thereof facing sideways or turned approximately 90 degrees from its normal work-engaging position in the chuck shown in the drawing. When the jaw 140 is positioned in this manner, the two ways 146 and 147 align with the keys 148 and 149 so that the jaw can be readily slipped axially onto the rocker arm 28. As soon as the keys 148 and 149 move into register with the annular groove 150, the jaw 140 can be turned 90 degrees to the position shown in FIGURE 4 to move the keys out of register with the ways 146 and 147 and into interfitting and interlocking relationship with the groove 150. As suggested, the keys 148 and 149 fit snugly within the groove 150 to prevent the jaws from tilting or rocking on the rocker arms in the direction of the chuck axis.

The jaws 140 normally fit the rocker arms 28 relatively loosely to facilitate mounting or removal of the jaws and also to assure easy turning of the jaws through the 90 degree motion required to interlock the jaws with the rocker arms. Thereafter, it is desirable that the jaws be tightened across the through slots 142 to pull the walls of the openings 144 snugly around the rocker arms but not so tightly that the jaws are prevented from rocking or turning about the axis of the arms within permissible limits to accommodate irregularities in the workpiece to be clamped. This rocking or floating adjustment of the jaws is necessary particularly in clamping rough castings or in any situation where there is variation among the workpieces in the external shape or configuration of the surface to be clamped.

In order to obtain the necessary close fit of the jaws 140 on the rocker arms 28, a clamp screw 154 extends through an opening 156 in each jaw at one side of the slot 142 and into an aligned, internally threaded hole 158 at the other side of the slot. This screw 154 can be tightened to draw the jaw 140 against the rocker arm 28 with just the desired amount of snugness, and a lock nut 160 on the screw within the slot 142 is tightened against the jaw at the inner side of the slot to hold the clamp screw in the selected adjusted position.

The extent of rocking or floating movement of the jaws 140 on rock shafts 28 is controlled in each instance by an adjusting screw 162 which is threaded into an opening 164 provided in the jaw opposite the through slot 142. As in the form of the invention first described, the adjusting screw 162 has a conical tip portion 166 which enters a correspondingly tapered socket or recess 168 in the rock shaft 28. Manifestly, if the adjusting screw 162 were tightened to press the tapered end 166 solidly into the socket 168, the jaw 140 would be prevented from turning on the rock shaft 128. Accordingly, in practice, the screw 162 is backed off sufficiently to provide the desired amount of rocking or floating motion. Because of the tapered tip 166, the amount of rocking motion increases progressively as the screw 162 is backed away. A lock nut 170 on the projecting outer end of the screw 162 holds the latter in a selected adjusted position. It is of course desirable to have the adjusting screw 162 extend into the socket 168 sufficiently to prevent excessive turning of the jaw 140. Otherwise, the jaw 140 might turn sufficiently through accident or inadvertence so that the work clamping face 152 would not engage the workpiece. Thus, the adjusting screw holds the jaw properly positioned on the chuck for engagement of the workpiece and at the same time permits the jaw to turn or float so as to adapt itself to irregularities in the workpiece.

A second socket or recess 168', similar to the socket 168, is provided in the opposite side of the shaft 128 to accommodate the adjusting screw 162 in the event the jaw 140 is mounted upside down or in a reverse position to the one shown.

Figure 5:
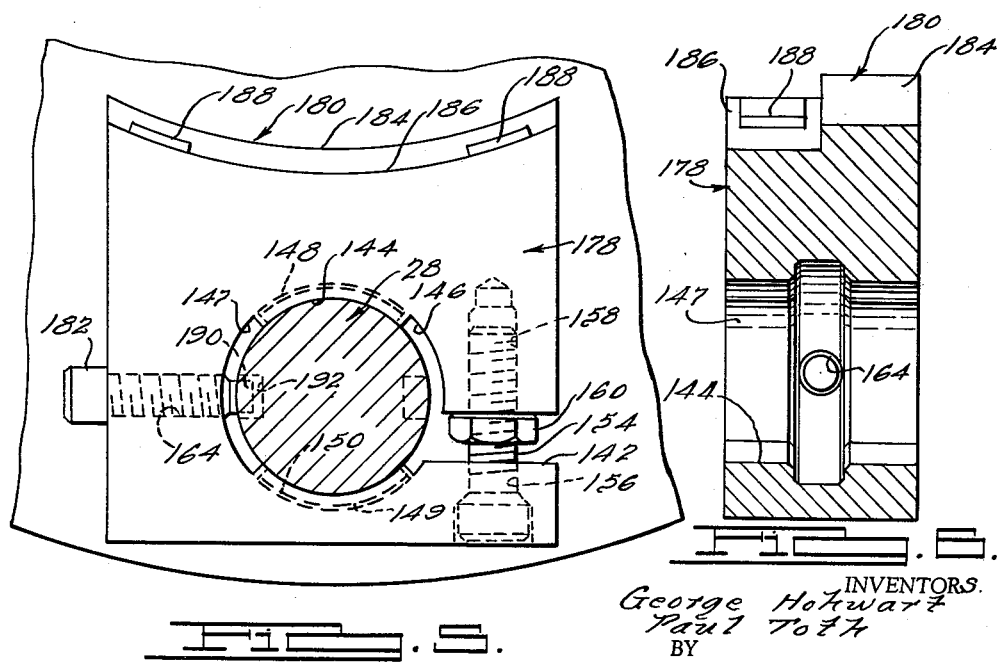
FIG. 5 is a front elevational view of the chuck similar to FIG. 4 but showing a modified jaw and jaw connection.

FIGURE 5 shows another modified form of jaw 178 which is similar in all material respects to the jaw 140 (FIGURE 4) and differs primarily in the shape of the jaw clamping face 180 and in the form of adjusting screw 182. Also, the plan shape of the jaw 178 differs slightly but this is without practical significance.

More particularly, the work clamping face 180 is stepped, as shown at 184 and 186, and jaw elements 188 are mounted on the rear surface 186 only. This particular configuration of jaw clamping face has primary utility in adapting the chuck for successive operations. For example, the jaw form shown in FIGURE 5 might be used to clamp the rough cast surface of a workpiece in a first operation using the rear surfaces 186 of the jaws and the inserts 188, and to clamp a finished machined surface by the smooth fore or inner clamping faces 184 in a second operation. As suggested, it is contemplated as a general thing, however, that the clamping faces of the jaws have whatever shape or configuration is necessary to adapt them to the particular workpiece and to the particular operation at hand.

The adjusting screw 182 has a blunt ended inner terminal portion 190 which projects into a correspondingly shaped socket 192 in the rock shaft 28, and the socket is larger in diameter than the inner end portion 190 to permit limited floating movement of the jaw 178. Thus, the adjusting screw 192 serves the same purpose as the adjusting screw 182 but it is not adjustable to vary the amount of float. In this form of the invention, the adjusting screw 182 is simply screwed in tight and the extent of float of the jaw is determined by the amount of clearance in the socket 192.

The work clamping jaws here shown and particularly the connection between the jaws and the rocker arms have been preeminently satisfactory in the form of chuck here under consideration. As a practical matter, the mounting and mode of attachment of the jaws presented a difficult problem because of the powerful leverage forces occurring in the jaws in use. At the same time, the jaws are readily replaceable or changeable on the rocker arms. More particularly, the projecting lugs on the rocker arms have proved to be exceedingly effective in holding the jaws rigid against these leverage forces and they obviate the necessity of through holes in the rocker arms or other means that would weaken the arms excessively. Also, the instant construction leaves the tops of the jaws flush with the rocker arms and free of projections which otherwise would interfere with the work or be otherwise objectionable. The bayonet connection between the jaws and the rocker arms assures maximum strength and rigidity in the jaw structure under actual operating conditions. The clamp screws and associated lock nuts permit adjusting the jaws to a desired fit on the rocker arms and provide means for holding them securely in the desired adjusted condition. This is desirable as excessive looseness in the jaws would introduce inaccuracies in the clamping operation and excessive tightness would not permit the jaws to float or at adapt to the workpiece. The cone point adjusting screws and lock nuts on the sides of the jaws permit selective adjustment of the amount of float afforded the jaws which in practice varies depending on the type of work performed and other factors. For example, this adjustment not only compensates for manufacturing tolerances but also permits selective adjustment of jaw float in accordance with the nature of the work and the length of jaw radially inwardly from the rocker arms. In this latter connection, it will be apparent that the linear motion of the jaws at the clamping faces varies in each instance directly with the radial distance of the clamping face from the rocker arm. Therefore, since the linear movement should be held relatively constant, it is necessary to vary the position of the adjusting screw with different size jaws. Manifestly, this adjustment can be made easily and quickly with the form of adjusting screw shown in FIGURES 2 and 4.

Having thus described our invention, we claim:

1. In a chuck having a movable arm provided with a substantially cylindrical outer end portion, a jaw comprising a body member having a bore in at least a portion thereof, coacting projection and slot means on said arm end portion and said bore alignable in one rotated position of said body on said arm, means forming a peripheral groove in one of said portions receiving said projection means in another rotated position of said body to prevent movement of the body axially of said arm, said arm portion having a conical cavity therein disposed within said bore, and means adjustably mounted on said body and having a conical end portion movable axially into said cavity to adjust the extent said body is rotatable on said arm.

2. In a chuck having a movable arm provided with a substantially cylindrical outer end portion, a jaw comprising a body member having a bore in at least a portion thereof, coacting projection and slot means on said arm end portion and said bore alignable in one rotated position of said body on said arm, means forming a peripheral groove in one of said portions receiving said projection means in another rotated position of said body to prevent movement of the body axially of said arm, said arm portion having a transversely extending cavity therein of a progressively decreasing size from the outer surface of said arm portion and disposed within said bore, and means adjustably mounted on said body and having an end portion of progressively decreasing size movable axially into said cavity to adjust the extent said body is rotatable on said arm.

3. In a chuck, a work-clamping jaw having an opening therein, a movable arm having a terminal portion journaled in said opening, said terminal portion having radially outwardly projecting keys disposed on opposite sides thereof and arranged on a radius of said chuck, and said opening having opposed axial ways disposed to accept said keys in one rotative position of the jaw on said arm and an annular groove extending from said ways adapted to receive and interfit with said keys in another rotative position of said jaw, and means interconnecting said arm and said jaw permitting a limited rotative or floating movement of the jaw on said arm in said other position thereof.

4. In a chuck, a movable arm having a terminal journal portion, a work-clamping jaw having an opening therein receiving the journal portion of said arm and permitting limited rotative floating movement of the jaw on the arm, said journal portion having radially outwardly projecting integral keys aligned with a radius of said chuck, said jaw opening having opposed axial ways disposed to accept said keys when the jaw is turned away from its normal clamping position to permit removal of the jaw from said arm and also having an annular groove extending through said ways adapted to receive and interfit with said keys when the jaw is in a work-clamping position, and detent means coactive with said arm and said jaw permitting limited floating movement of the jaw in the work-clamping position.

5. In a chuck, a movable arm having a terminal journal portion, a work-clamping jaw mounted on the journal portion of said arm for limited rotative floating movement, said journal portion having radially outwardly projecting integral keys aligned with a radius of said chuck, said jaw having an opening accepting said journal portion and having opposed axial ways disposed to receive said keys when the jaw is turned away from its normal clamping position to permit removal of the jaw from said arm and also having an annular groove extending through said ways adapted to receive and interfit with said keys when the jaw is in a work-clamping position, and an adjusting screw carried by the jaw registrable with a recess in the arm when the jaw is in a work-clamping position and normally extending into said recess to hold the jaw in said work-clamping position.

6. In a chuck, a movable arm having a terminal journal portion, a work-clamping jaw mounted on the journal portion of said arm for limited rotative floating movement, said journal portion having radially outwardly projecting integral keys aligned with a radius of said chuck, said jaw having an opening fitted over said journal portion and a through slot extending from said opening, said opening having opposed axial ways disposed to accept said keys when the jaw is turned away from its normal clamping position to permit removal of the jaw from the arm and also having an annular groove extending through said ways adapted to receive and interfit with said keys when the jaw is in a work-clamping position, a clamp screw connecting the parts of said jaw on opposite sides of said through slot operable to selectively adjust the fit of the jaw on said arm, and detent means coactive with said arm and said jaw limiting floating movement of the jaw in the work-clamping position.

7. In a chuck, a movable arm having a terminal journal portion, a work-clamping jaw mounted on the journal portion of said arm for limited rotative floating movement, said journal portion having radially outwardly projecting integral keys aligned with a radius of said chuck, said jaw having an opening accepting said journal portion and a through slot extending radially from said opening, said opening having opposed axial ways disposed to accept said keys when the jaw is turned away from its normal clamping position to permit removal of the jaw from said arm and also having an annular groove extending through said ways adapted to receive and interfit with said keys when the jaw is in a work-clamping position, a clamp screw connecting the parts of said jaw on opposite sides of said through slot operable to selectively adjust the fit of the jaw on said arm, a lock nut on said clamp screw in said through slot for holding said clamp screw in a selected adjusted position, and an adjusting screw carried by the jaw registrable with a recess in the arm when the jaw is in a work-clamping position and normally extending into said recess to hold the jaw in said work-clamping position.

References Cited in the file of this patent

UNITED STATES PATENTS

| | | |
|---|---|---|
| 1,020,492 | Griggs | Mar. 19, 1912 |
| 1,918,439 | Warman | July 18, 1933 |
| 2,494,166 | Drissner | Jan. 10, 1950 |
| 2,778,652 | Ingwer | Jan. 22, 1957 |